(12) United States Patent
Yang

(10) Patent No.: US 8,386,856 B2
(45) Date of Patent: Feb. 26, 2013

(54) DATA STORAGE DEVICE CAPABLE OF SELECTING SCRAMBLED SIGNALS ACCORDING TO TRANSMISSION POWER

(75) Inventor: Tsung-Chieh Yang, Hsinchu (TW)

(73) Assignee: Silicon Motion, Inc., Jhubei (TW)

( * ) Notice: Subject to any disclaimer, the term of this patent is extended or adjusted under 35 U.S.C. 154(b) by 467 days.

(21) Appl. No.: 12/692,618

(22) Filed: Jan. 24, 2010

(65) Prior Publication Data

US 2011/0035645 A1    Feb. 10, 2011

Related U.S. Application Data

(60) Provisional application No. 61/222,465, filed on Jul. 1, 2009.

(30) Foreign Application Priority Data

Aug. 10, 2009   (TW) ................. 98126689 A

(51) Int. Cl.
G06F 11/00    (2006.01)
G11C 29/00    (2006.01)
H03M 13/00    (2006.01)

(52) U.S. Cl. ................ 714/701; 714/719; 714/761
(58) Field of Classification Search .............. 714/701, 714/702, 719, 746, 761
See application file for complete search history.

(56) References Cited

U.S. PATENT DOCUMENTS

| | | | |
|---|---|---|---|
| 6,304,482 B1 | 10/2001 | Lin | |
| 7,411,898 B2 * | 8/2008 | Erlich et al. | 370/208 |
| 8,077,784 B2 * | 12/2011 | Nishikawa | 375/260 |
| 8,189,711 B2 * | 5/2012 | Shimizu | 375/295 |
| 2005/0229081 A1 * | 10/2005 | Lin et al. | 714/769 |
| 2011/0202780 A1 * | 8/2011 | Ko | 713/320 |

FOREIGN PATENT DOCUMENTS

| | | |
|---|---|---|
| CN | 1755819 A | 4/2006 |
| CN | 101447216 A | 6/2009 |
| TW | 200907985 | 2/2009 |
| WO | 2006/022802 A1 | 3/2006 |

OTHER PUBLICATIONS

Ik Joon Chang; Jae-Joon Kim; Park, S.P.; Roy, K.; , "A 32 kb 10T Sub-Threshold SRAM Array With Bit-Interleaving and Differential Read Scheme in 90 nm CMOS," Solid-State Circuits, IEEE Journal of , vol. 44, No. 2, pp. 650-658, Feb. 2009.*
Jahinuzzaman, S.; Shakir, T.; Lubana, S.; Shah, J.S.; Sachdev, M.; , "A multiword based high speed ECC scheme for low-voltage embedded SRAMS," Solid-State Circuits Conference, 2008. ESSCIRC 2008. 34th European , vol., No., pp. 226-229, Sep. 15-19, 2008.*
Nimbalker, A.; Blankenship, T.K.; Classon, B.; Fuja, T.E.; Costello, D.J.; , "Contention-Free Interleavers for High-Throughput Turbo Decoding," Communications, IEEE Transactions on , vol. 56, No. 8, pp. 1258-1267, Aug. 2008.*
International Search Report for a corresponding PCT patent application (No. PCT/CN2009/073171) issued on Mar. 25, 2010.
Office Action of corresponding TW application, published on Jan. 3, 2013.

* cited by examiner

*Primary Examiner* — Cynthia Britt
(74) *Attorney, Agent, or Firm* — Wang Law Firm, Inc.; Li K. Wang; Stephen Hsu

(57) ABSTRACT

The invention provides a data storage device. In one embodiment, the data storage device comprises a memory and a controller. The memory is for data storage. When the data storage device receives first source data to be written to the memory from a host, the controller generates at least one first input data according to the first source data, scrambles the first input data according to a plurality of pseudo random sequences to obtain a plurality of first scrambled signals, calculates a plurality of transmission powers of the first scrambled signals, and selects a target scrambled signal with a lowest transmission power to be stored in the memory from the first scrambled signals.

20 Claims, 7 Drawing Sheets

DATA STORAGE DEVICE CAPABLE OF SELECTING SCRAMBLED SIGNALS ACCORDING TO TRANSMISSION POWER

CROSS REFERENCE TO RELATED APPLICATIONS

This application claims the benefit of U.S. Provisional Application No. 61/222,465, filed on Jul. 1, 2009, the entirety of which is incorporated by reference herein.

This Application claims priority of Taiwan Patent Application No. 98126689, filed on Aug. 10, 2009, the entirety of which is incorporated by reference herein.

BACKGROUND OF THE INVENTION

1. Field of the Invention

The invention relates to memories, and more particularly to data access of memories.

2. Description of the Related Art

Before data is written to a memory, a controller of the memory usually scrambles the data with a scrambler, thus making bits 0 and 1 to have a random distribution in the data. The scrambled data is then stored in the memory, thus preventing bits 0 and 1 from massing in a specific segment of the data. For example, a flash memory is classified into a single-level-cell (SLC) flash memory or a multi-level-cell (MLC) flash memory. When data is written to a MLC flash memory, if the data comprises segments comprising massed bits 0 or massed bits 1, an error bit rate of the data is increased. A controller of the MLC flash memory therefore has to scramble the data before the data is written to the MLC flash memory.

The data scrambled by a scrambler, however, has deficiency. A controller usually transmits data to a flash memory via a data bus. When the controller sends a data bit 1 to the flash memory, a voltage level of the data bus is increased to a logic high level. When the controller sends a data bit 0 to the flash memory, the voltage level of the data bus is decreased to a logic low level. Because bits 0 and 1 in scrambled data have randomized distributions, when the controller sends the scrambled data to the memory for storage via the data bus, the voltage level on the data bus frequently oscillates between the logic high level and the logic low level. The data bus therefore requires high power due to the frequent oscillation of voltage levels thereon, thus increasing power consumption of a system. When the system comprising the controller and the memory is a portable device with a battery power supply, the time span in which the system operates under a normal voltage supply is shorten, thus degrading the performance of the system. Thus, a controller which can scramble data with low power consumption is desired.

BRIEF SUMMARY OF THE INVENTION

The invention provides a data storage device. In one embodiment, the data storage device comprises a memory and a controller. The memory is for data storage. When the data storage device receives first source data to be written to the memory from a host, the controller generates at least one first input data according to the first source data, scrambles the first input data according to a plurality of pseudo random sequences to obtain a plurality of first scrambled signals, calculates a plurality of transmission powers of the first scrambled signals, and selects a target scrambled signal with a lowest transmission power to be stored in the memory from the first scrambled signals.

The invention provides a data access method. First, first source data to be written to a memory from a host is received. At least one first input data is then generated according to the first source data. The first input data is then scrambled according to a plurality of pseudo random sequences to obtain a plurality of first scrambled signals. A plurality of transmission powers of the first scrambled signals is then calculated. A target scrambled signal with a lowest transmission power is then selected from the first scrambled signals to be stored in the memory.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
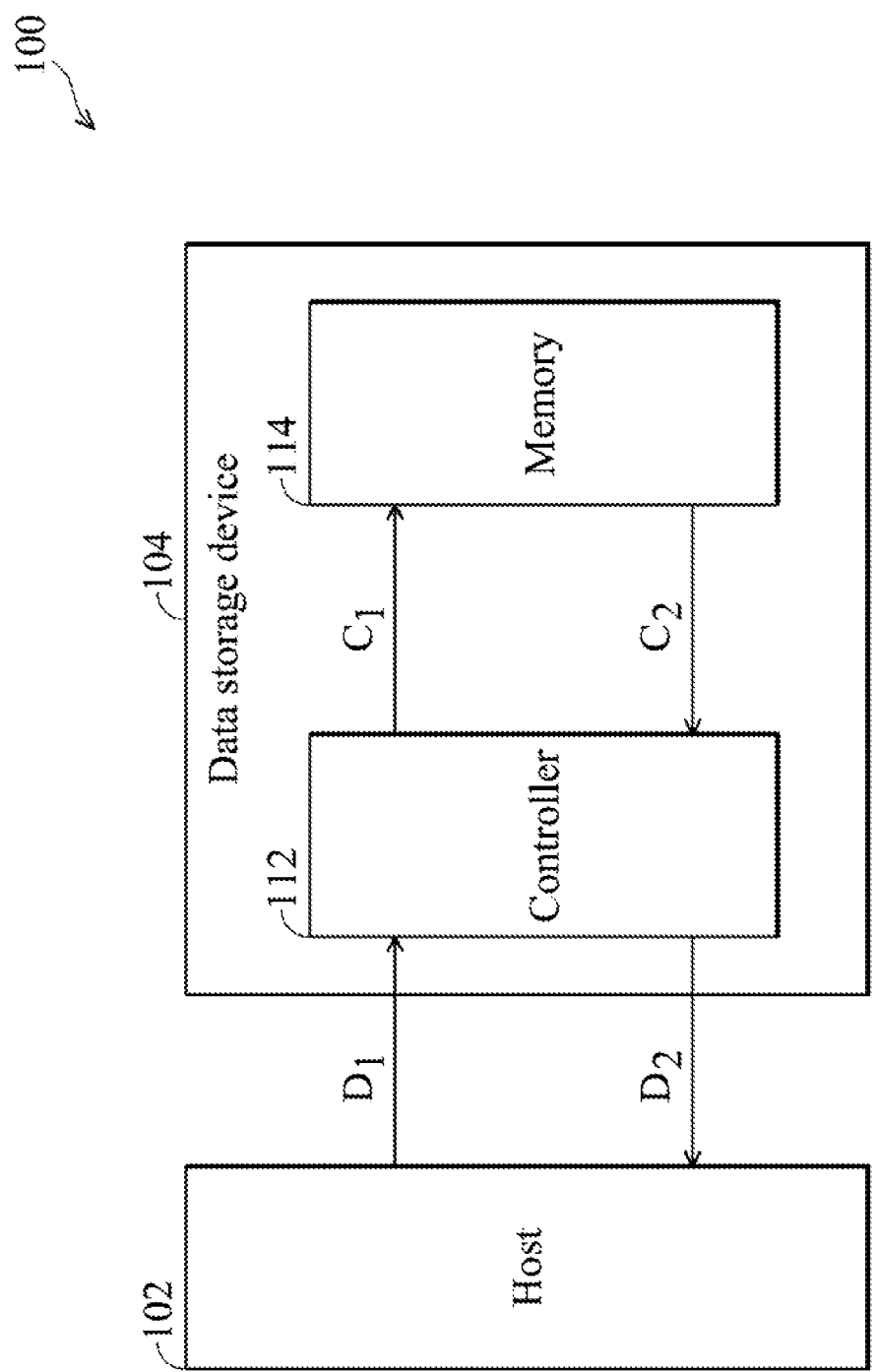
FIG. 1 shows a data storage device according to the invention.

Referring to FIG. 1, a data storage device 104 according to the invention is shown. The data storage device 100 is coupled to a host 102 and accesses data according to instructions from the host 102. In one embodiment, the data storage device 104 comprises a controller 112 and a memory 114. The memory 114 is for data storage. The controller 112 accesses data stored in the memory 114 according to instructions sent by the host 102. In one embodiment, a data bus is coupled between the controller 112 and the memory 114 for data transmission. For example, when the host 102 wants to store data $D_1$ to the data storage device 104, the controller 112 first receives data $D_1$ from the host 102, then encodes the data $D_1$ to obtain an error correction code $C_1$, and then sends the error correction code $C_1$ to the memory 114 for storage. When the host 102 wants to read data from the data storage device 104, the controller 112 directs the memory 114 to read an error correction code $C_2$ stored therein, then decodes the error correction code $C_2$ to obtain data $D_2$, and then sends the data $D_2$ to the host 102.

Before the controller 112 stores the data $D_1$ to the memory 114, the controller 112 scrambles the bits 0 and 1 of the data $D_1$, thus making the bits 0 and 1 of the scrambled data have randomized distributions, and making the scrambled data have a characteristic that is consuming lower power during being transmitted. The scrambled data is then encoded to obtain the error correction code $C_1$. Thus, when the data bus transmits the error correction code $C_1$ from the controller 112 to the memory 114, the transmission power required by the data bus is reduced. Similarly, because the error correction code $C_2$ is stored in a format with a low transmission power in the memory 114, when the data bus transmits the error correction code $C_2$ from the memory 114 to the controller 112, the data bus requires less power to transmit the error correction code $C_2$. The data storage device 104 therefore consumes a less power than that of a conventional data storage device. The data storage device 104 therefore has improved performance in comparison with a conventional data storage device.

Figure 2:
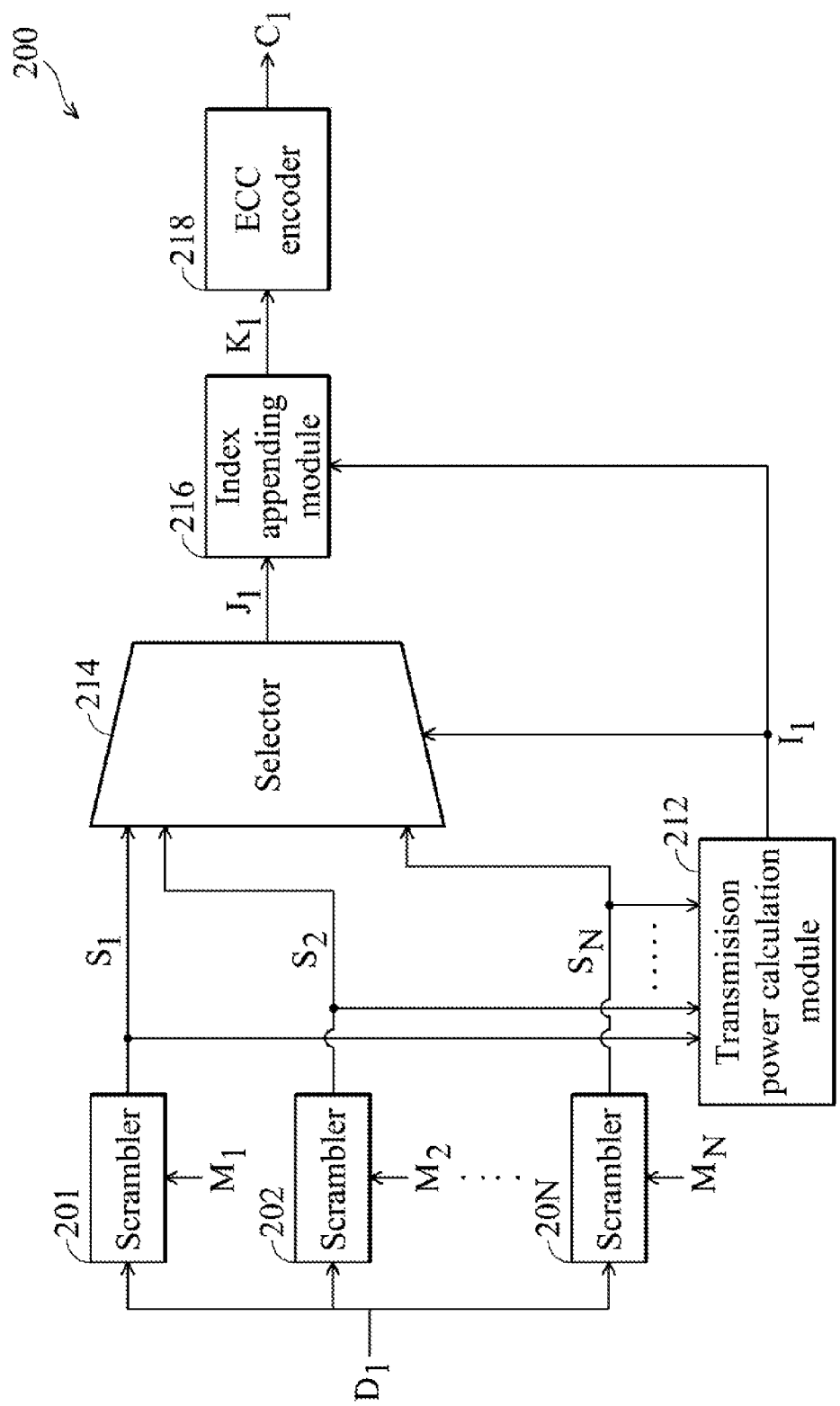
FIG. 2 is a block diagram of a write-data processing circuit of a controller according to the invention.
Figure 3:
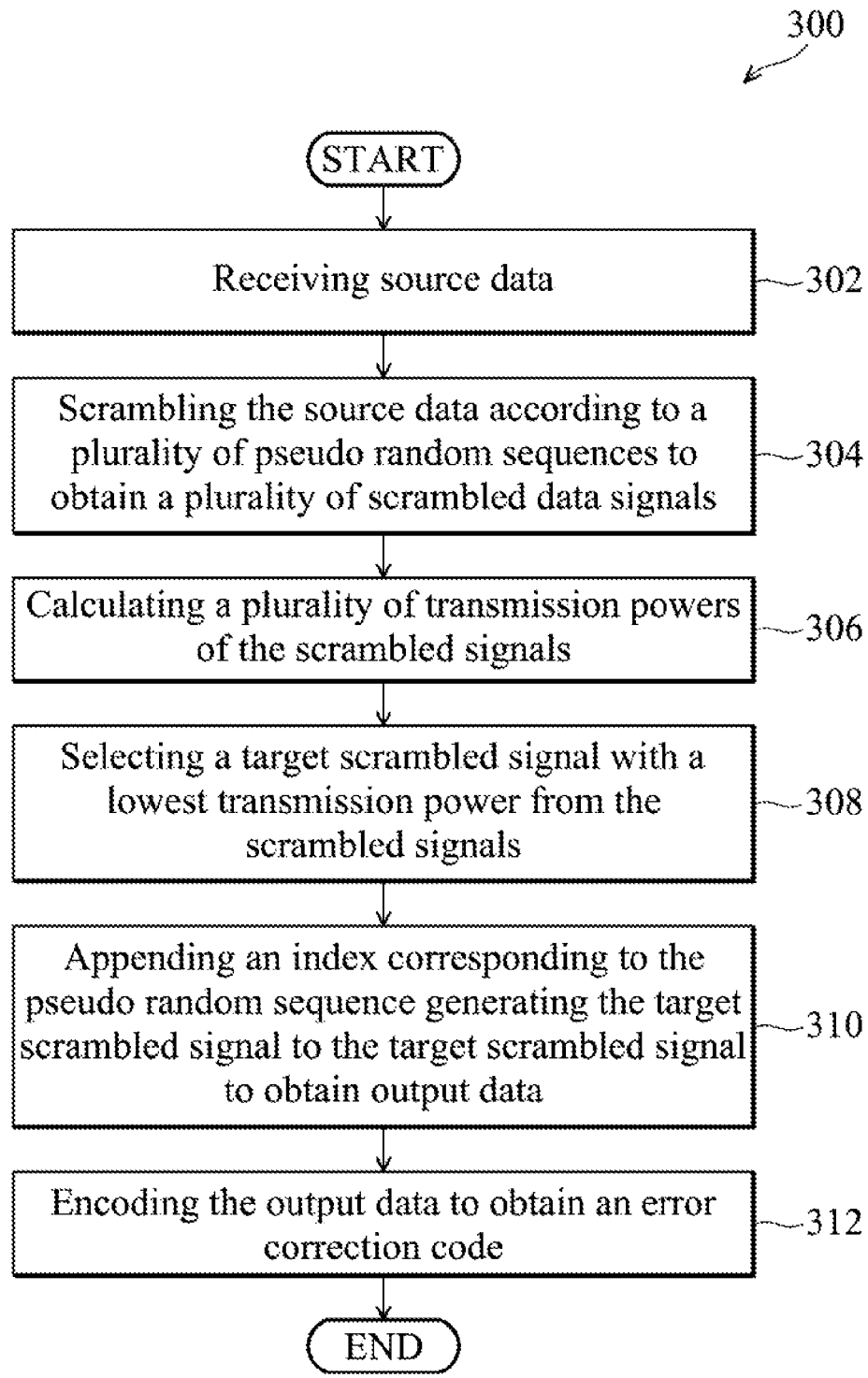
FIG. 3 is a flowchart of a method for processing data to be written to a memory according to the invention.

Referring to FIG. 2, a block diagram of a write-data processing circuit of a controller 200 according to the invention is shown. The other circuit components irrelevant to processing of write data are omitted in FIG. 2. In one embodiment, the controller 200 comprises a plurality of scramblers 201~20N, a transmission power calculation module 212, a selector 214, an index appending module 216, and an error correction code (ECC) encoder 218. Referring to FIG. 3, a flowchart of a method 300 for processing data to be written to a memory 114 according to the invention is shown. The controller 200 processes data received from the host 102 according to the method 300 shown in FIG. 3. First, the controller 200 receives source data $D_1$ to be written to the memory 114 from the host 102 (step 302). The scramblers 201, 202, ..., 20N then respectively scramble the data $D_1$ according to a plurality of pseudo random sequences $M_1$, $M_2$, ..., $M_N$ to obtain a plurality of scrambled signals $S_1$, $S_2$, ..., $S_N$ (step 304). In one embodiment, the scramblers 201~20N respectively performs XOR operations on the data $D_1$ and the plurality of pseudo random sequences $M_1$, $M_2$, ... $M_N$ to obtain the scrambled signals $S_1$, $S_2$, ..., $S_N$. Because the bits 0 and 1 in the scrambled signals $S_1$, $S_2$, ..., $S_N$ have random distributions, the scrambled signals $S_1$, $S_2$, ..., $S_N$ have low error bit rates when the scrambled signals $S_1$, $S_2$, ..., $S_N$ are stored in the memory 114.

The transmission power calculation module 212 then calculates a plurality of transmission powers of the scrambled signals $S_1$, $S_2$, ..., $S_N$ to be transmitted on the data bus (step 306). The transmission power calculation module 212 then selects a target scrambled signal with the lowest transmission power from the scrambled signals $S_1$, $S_2$, ..., $S_N$ (step 308). and then outputs an index $I_1$ of a target pseudo random sequence corresponding to (for generating) the target scrambled signal. In one embodiment, the number of the pseudo random sequences $M_1$, $M_2$, ..., $M_N$ is N, and the bit number of the index $I_1$ of the target pseudo random sequence is less than $Log_2 N$. The selector 214 then selects the target scrambled signal $J_1$ with the lowest transmission power from the scrambled signals $S_1$, $S_2$, ..., $S_N$ according to the index $I_1$. The index appending module 216 then appends the index $I_1$ to the end of the target scrambled signal $J_1$ to obtain an output data $K_1$ (step 310). The error correction code encoder 218 then encodes the output data $K_1$ to obtain an error correction code $C_1$ to be stored in the memory 114 (step 312). Because the error correction code $C_1$ has the same bit content with that of the target scrambled signal except for a parity and the index $I_1$, the data bus transmits the error correction code $C_1$ to the memory 114 with a low transmission power.

Figure 4:
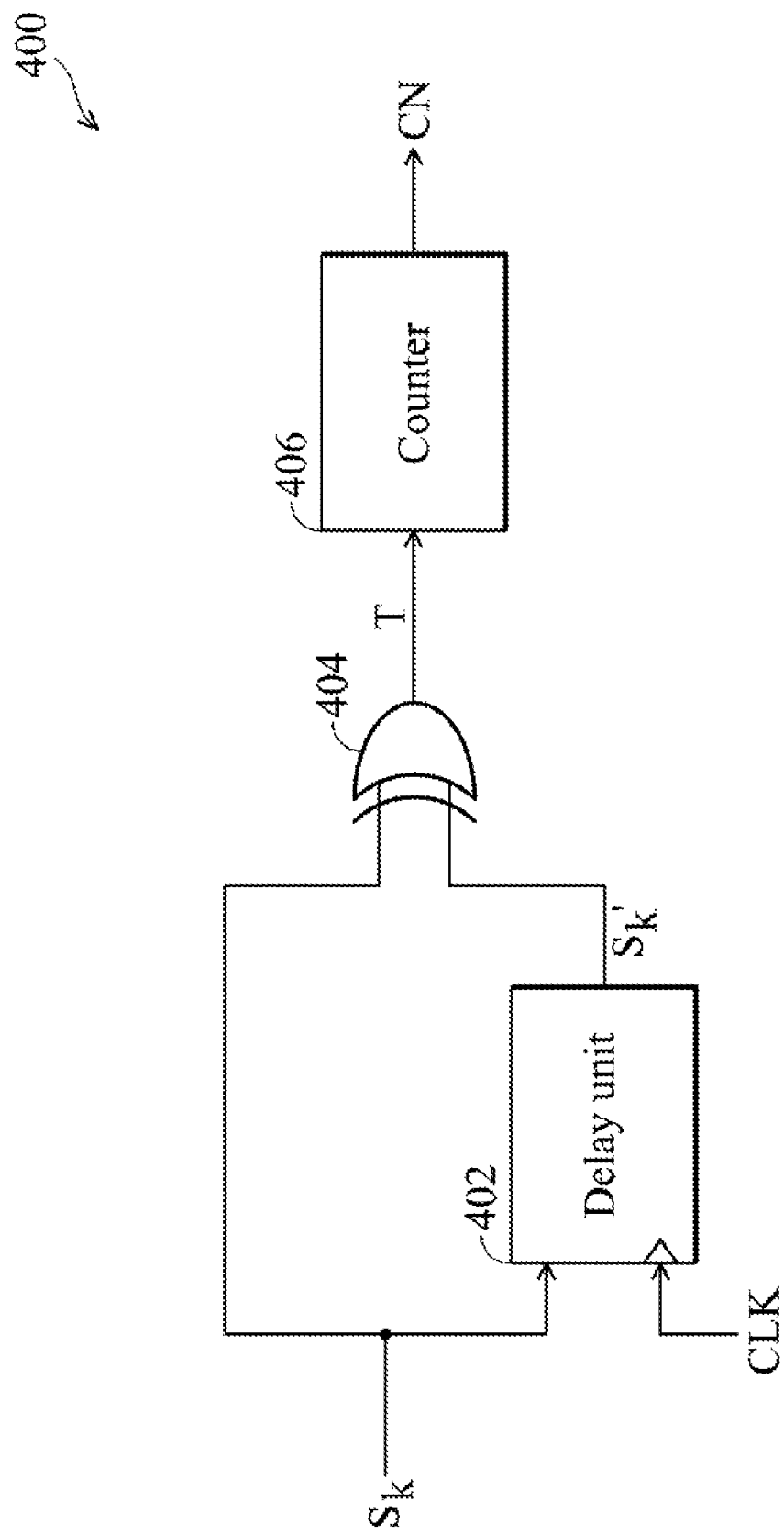
FIG. 4 is a circuit diagram of a transmission power calculation module according to the invention.

Referring to FIG. 4, a circuit diagram of a transmission power calculation module 400 according to the invention is shown. The transmission power calculation module 400 comprises a delay unit 402, an XOR gate 404, and a counter 406. Assume that the transmission power calculation module 400 receives a scrambled signal $S_k$ from a scrambler, wherein the index k may be selected from the numbers 1~N. The delay unit 402 delays the scrambled signal $S_k$ by a clock period to obtain a delayed signal $S_k'$. The XOR gate 404 then performs an XOR operation on the delayed signal $S_k'$ and the scrambled signal $S_k$ to obtain a transition signal T. When the bit of the scrambled signal $S_k$ changes from the value 0 to the value 1 or from the value 1 to the value 0, the transition signal has a corresponding value of 1. The counter 406 then accumulates the transition signal to count the number CN of times of value changes of the scrambled signal $S_k$. Thus, when the number CN of times of value changes of the scrambled signal $S_k$ is high, the data bus requires a high power to transmit the scrambled signal $S_k$.

Figure 5:
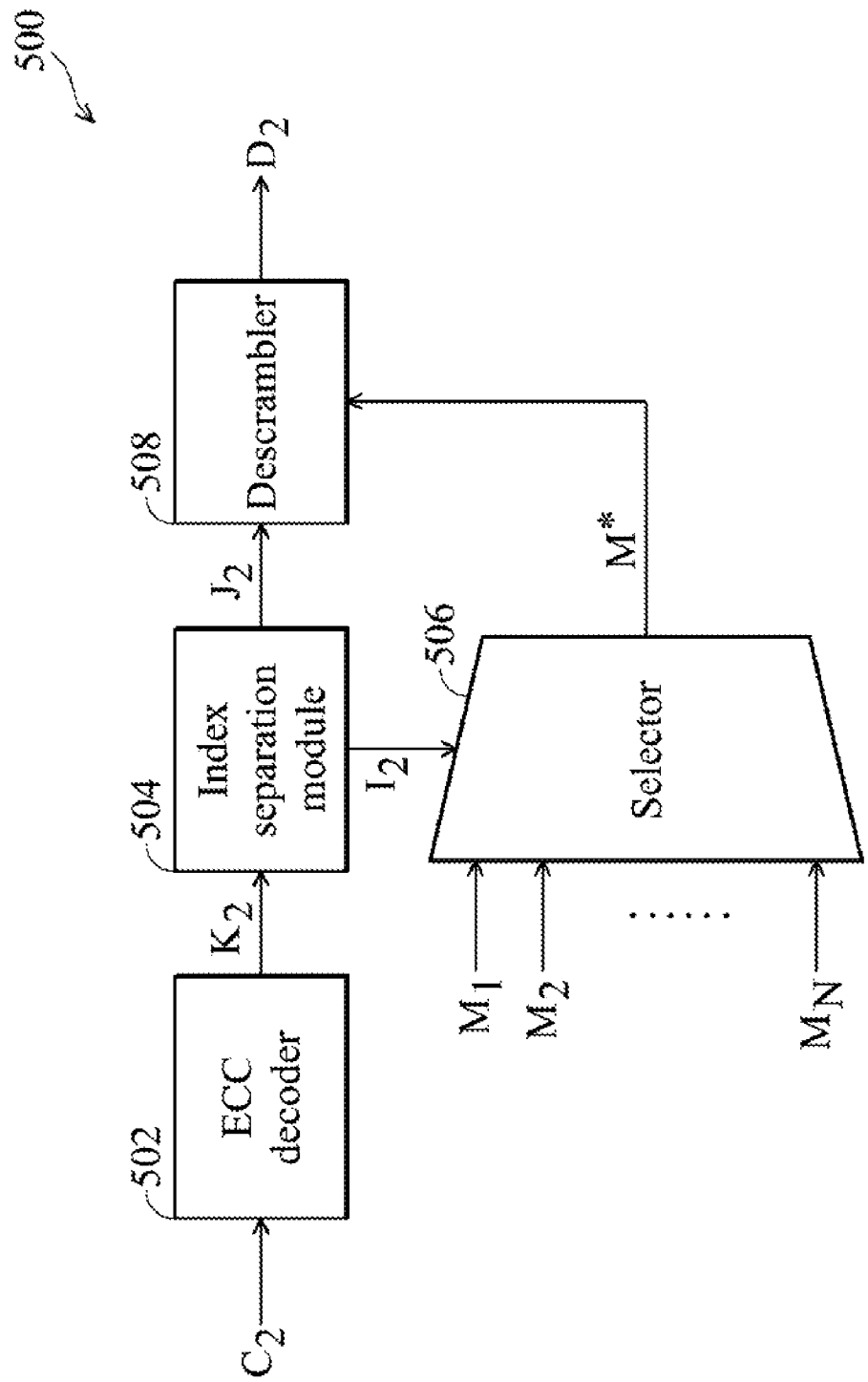
FIG. 5 is a block diagram of a read-data processing circuit of a controller according to the invention.
Figure 6:
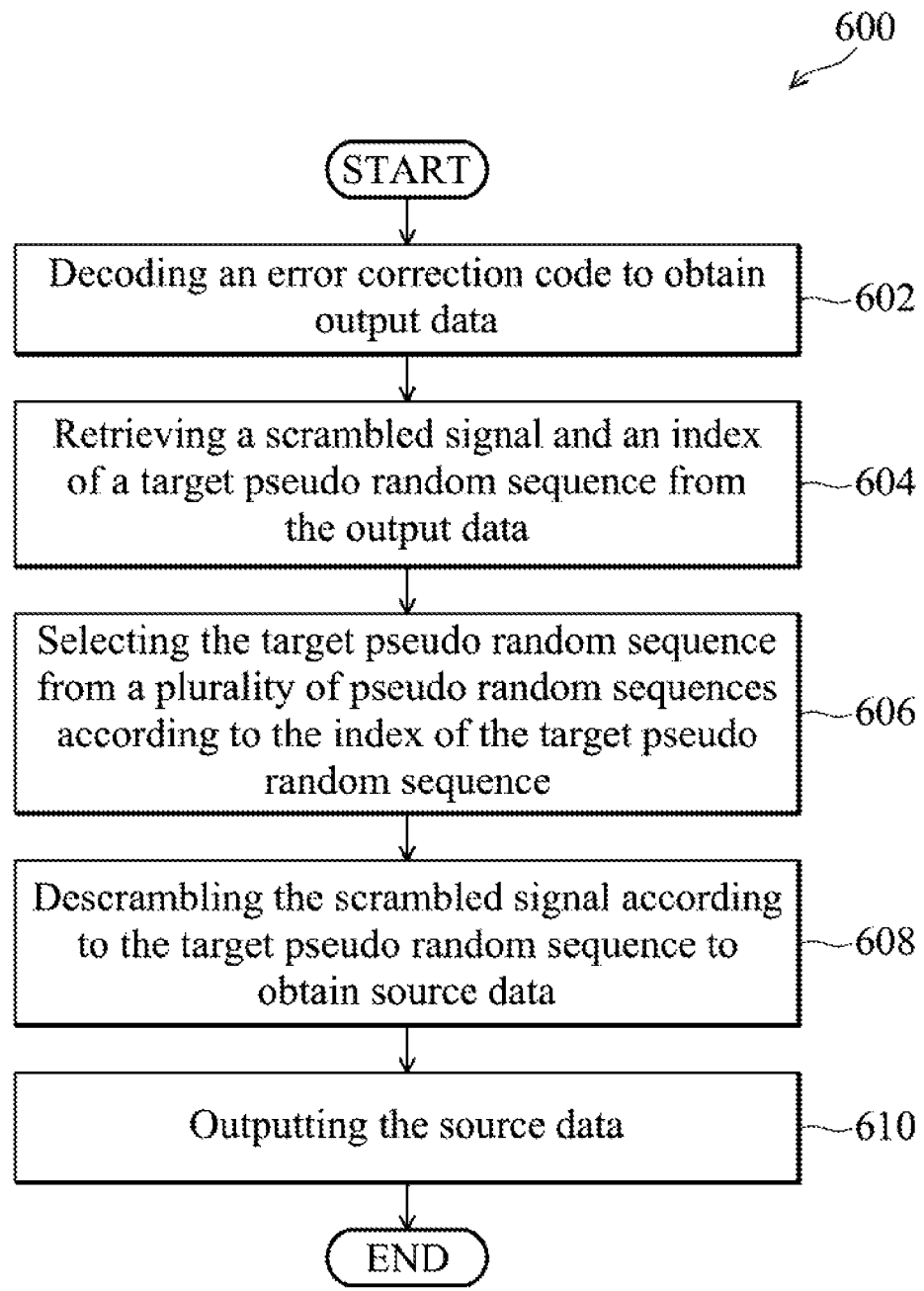
FIG. 6 is a flowchart of a method for processing data read out from a memory according to the invention.

Referring to FIG. 5, a block diagram of a read-data processing circuit of a controller 500 according to the invention is shown. In one embodiment, the controller 500 comprises an error correction code (ECC) decoder 502, an index separation module 504, a selector 506, and a descrambler 508. Referring to FIG. 6, a flowchart of a method 600 for processing data read out from the memory 114 according to the invention is shown. The controller 500 processes data read out from the memory 114 according to the method 600 and then delivers the processed data to the host 102. First, when the controller 500 receives a read command from the host 102, the controller 500 directs the memory 114 to read an error correction code $C_2$. After the controller 500 receives the error correction code $C_2$ from the memory 114, the ECC decoder 502 then decodes the error correction code $C_2$ to obtain output data $K_2$ (step 602).

Because the output data $K_2$ comprises a scrambled signal and an index of a target pseudo random sequence, the index separation module 504 retrieves the scrambled signal $J_2$ and the index $I_2$ of the target pseudo random sequence from the output data $K_2$ (step 604). The selector 506 then selects the target pseudo random sequence M* from a plurality of pseudo random sequences $M_1$, $M_2$, ..., $M_N$ according to the index $I_2$ (step 606). The descrambler 508 then descrambles the scrambled signal $J_2$ according to the target pseudo random sequence M* to obtain source data $D_2$ (step 608). In one embodiment, the descrambler 508 performs an XOR operation on the bits of the scrambled signal $J_2$ and the target pseudo random sequence M* to obtain the source data $D_2$. Finally, the controller 500 sends the source data $D_2$ to the host 102 to complete the read operation.

Figure 7:
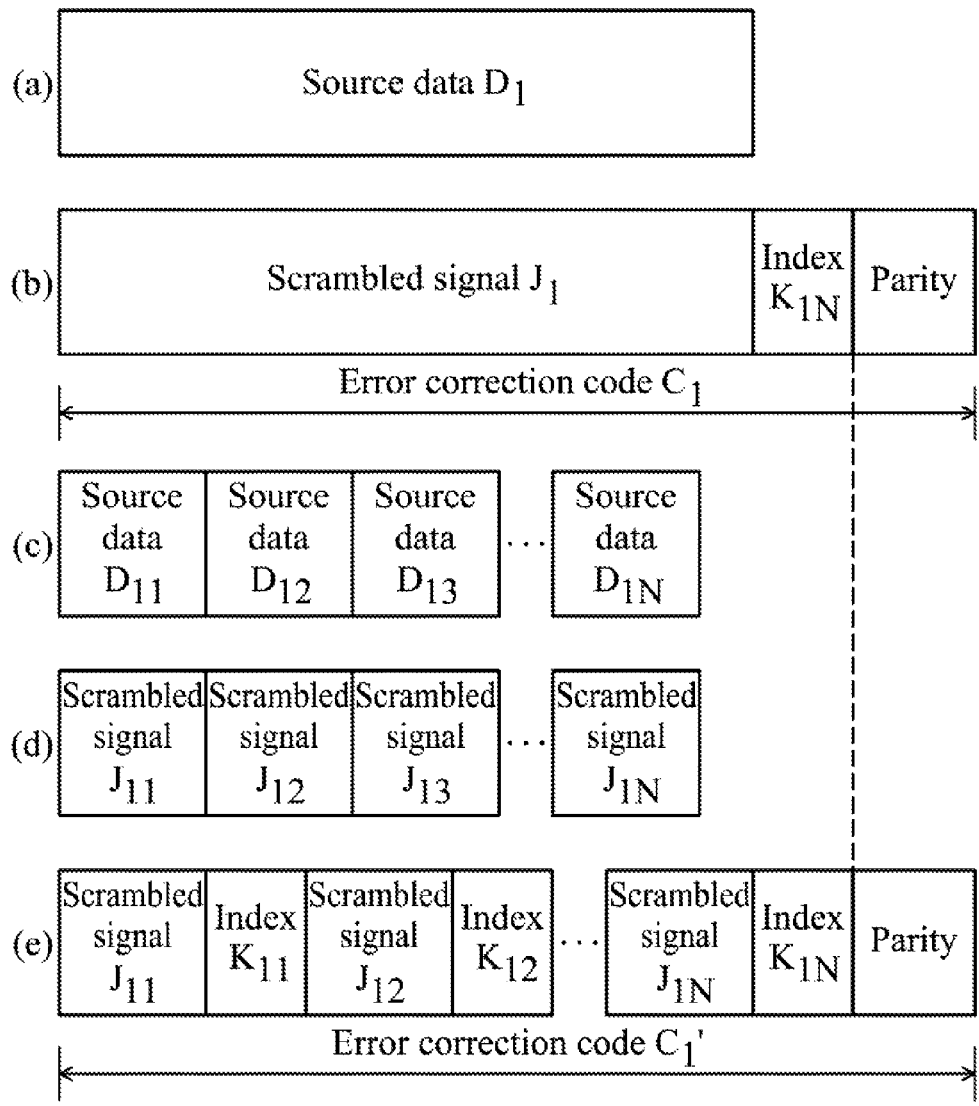
FIG. 7 is a schematic diagram of an embodiment of a data access method according to the invention.

Referring to FIG. 7, a schematic diagram of an embodiment of a data access method according to the invention is shown. Assume that the controller 112 receives source data $D_1$ to be written to the memory 114 from the host 102, as shown in (a) of FIG. 7. The controller 112 then converts the source data $D_1$ to scrambled signal $J_1$ shown in (b) of FIG. 7, wherein the scrambled signal $J_1$ has the lowest transmission power. The controller 112 then appends an index $K_{1N}$ of a pseudo random sequence and a parity to the end of the scrambled signal $J_1$ to obtain an error correction code $C_1$, as shown in (b) of FIG. 7. The plurality of pseudo random sequences $M_1$, $M_2$, ..., $M_N$ shown in FIG. 2 have the same data length as the source data $D_1$, and the controller 112 must comprise buffers to store the pseudo random sequences $M_1$, $M_2$, ..., $M_N$. To shorten the buffer length of the controller 112, the data lengths of the source data $D_1$ and the pseudo random sequences $M_1$, $M_2$, ..., $M_N$ are reduced, thus reducing hardware costs of the controller 112.

In another embodiment, the controller 112 divides the source data $D_1$ (e.g. data length of the source data $D_1$ is a page) into a plurality of segments $D_{11}$, $D_{12}$, ..., $D_{1N}$, as shown in (c) of FIG. 7. Each segment $D_{11}$, $D_{12}$, ..., $D_{1N}$ has a data length equal to 1/N of that of the source data $D_1$. The controller 112 then sequentially scrambles the segments $D_{11}$, $D_{12}$, ..., $D_{1N}$ to obtain scrambled signals $J_{11}$, $J_{12}$, ..., $J_{1N}$, as shown in (d) of FIG. 7. The controller 112 then combines the indexes $K_{11}, K_{12}, \ldots, K_{1N}$ of the pseudo random sequences with the scrambled signals $J_{11}, J_{12}, \ldots,$ and $J_{1N}$, to obtain the error correction code $C_1'$, as shown in (e) of FIG. 7. Because each of the segments $D_{11}, D_{12}, \ldots, D_{1N}$ has a data length equal to 1/N of the source data $D_1$, the data lengths of the buffers of the controller 112 are also equal to 1/N of the source data $D_1$ to hold the pseudo random sequences $M_1, M_2, \ldots, M_N$, thus reducing hardware costs of the controller 112.

In another embodiment, encoding of an error correction code and scrambling of data are simultaneously performed. After the index appending module 216 appends the index $K_{11}$ to the end of the scrambled signal $J_{11}$, the error correction code encoder 218 simultaneously encodes the scrambled signal $J_{11}$ and the index $K_{11}$ to obtain an error correction code $C_{11}$ comprising a parity $P_{11}$. When the error correction code encoder 218 generates the error correction code $C_{11}$, the scrambler 201~20N scrambles the segment $D_{12}$, and the transmission power calculation module 212 and the selector 214 selects a scrambled signal $J_{12}$ with the lowest transmission power. Similarly, when the error correction code encoder 218 generates the error correction code $C_{12}$, the scrambler 201~20N scramble the segment $D_{13}$, and the transmission power calculation module 212 and the selector 214 selects a scrambled signal $J_{13}$ with the lowest transmission power. Thus, encoding of an error correction code and scrambling of data are simultaneously performed to improve performance of the controller 200.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
    a memory;
    a controller, coupled between a host and a memory, receiving first source data to be written to the memory from the host, scrambling at least one first input data with a plurality of pseudo random sequences to obtain a plurality of first scrambled signals, calculating a plurality of transmission powers of the first scrambled signals, and selecting a target scrambled signal with the lowest transmission power to be stored in the memory from the first scrambled signals, wherein the first input data is the source data or generated by dividing the source data.

2. The data storage device as claimed in claim 1, wherein the controller appends an index of a target pseudo random sequence to generate the target scrambled signal to obtain a first output data, encodes the first output data to obtain a first error correction code, and stores the first error correction code to the memory.

3. The data storage device as claimed in claim 1, wherein the controller comprises:
    a plurality of scramblers, respectively scrambling the first input signal with the pseudo random sequences to obtain the first scrambled signals;
    a transmission power calculation module, calculating the transmission powers of the first scrambled signals, determining the lowest transmission power from the transmission powers of the first scrambled signals, and outputting an index of the lowest transmission power; and
    a selector, selecting the target scrambled signal corresponding to the index of the lowest transmission power from the scrambled signals.

4. The data storage device as claimed in claim 3, wherein the scramblers respectively perform XOR operations on the first input data and the plurality of pseudo random sequences to obtain the first scrambled signals.

5. The data storage device as claimed in claim 3, wherein the controller further comprises:
    an index appending module, appending the index of the target pseudo random sequence to the target scrambled signal to obtain a first output data; and
    an error correction code encoder, encoding the first output data to obtain a first error correction code to be stored to the memory.

6. The data storage device as claimed in claim 3, wherein the transmission power calculation module further comprises:
    a plurality of delay units, respectively delaying the first scrambled signals to obtain a plurality of delayed signals;
    a plurality of XOR gates, respectively performing XOR operations on the delayed signals and corresponding scrambled signals to obtain a plurality of transition signals; and
    a plurality of counters, respectively counting the numbers of times signal value transition occurs in the transition signals to obtain the transmission powers.

7. The data storage device as claimed in claim 1, wherein the controller divides the first source data to a plurality of segments as a plurality of pieces of the first input data.

8. The data storage device as claimed in claim 7, wherein when the controller scrambles one of the segments, the controller also simultaneously encodes an output data corresponding to another one of the segments to obtain an error correction code.

9. The data storage device as claimed in claim 1, wherein when the controller receives a read command from the host, the controller directs the memory to read a second error correction code to be output to the controller, decodes the second error correction code to obtain second output data, retrieves a second index and a second scrambled signal from the second output data, selects a target pseudo random sequence corresponding to the second index from the plurality of pseudo random sequences, descrambles the second scrambled signal with the target pseudo random sequence to obtain second source data, and outputs the second source data to the host.

10. The data storage device as claimed in claim 9, wherein the controller further comprises:
    an error correction code decoder, decoding the second error correction code to obtain the second output data;
    an index separation module, retrieving the second index and the second scrambled signal from the second output data;
    a selector, selecting the target pseudo random sequence corresponding to the second index from the plurality of pseudo random sequences; and
    a scrambler, descrambling the second scrambled signal with the target pseudo random sequence to obtain the second source data.

11. The data storage device as claimed in claim 10, wherein the descrambler performs an XOR operation on the target pseudo random sequence and the second scrambled signal to obtain the second source data.

12. The data storage device as claimed in claim 1, wherein the memory is a flash memory.

13. A data access method, comprising:
   receiving first source data to be written to a memory from a host;
   scrambling at least one first input data with a plurality of pseudo random sequences to obtain a plurality of first scrambled signals;
   calculating a plurality of transmission powers of the first scrambled signals; and
   selecting a target scrambled signal with a lowest transmission power to be stored in the memory from the first scrambled signals, wherein the first input data is the source data or generated by dividing the source data.

14. The data access method as claimed in claim 13, wherein the method further comprises:
   appending an index of a target pseudo random sequence for generating the target scrambled signal to the target scrambled signal to obtain a first output data;
   encoding the first output data to obtain a first error correction code; and
   storing the first error correction code to the memory.

15. The data access method as claimed in claim 13, wherein scrambling of the first input data comprises:
   respectively performing XOR operations on the first input data and the plurality of pseudo random sequences to obtain the first scrambled signals.

16. The data access method as claimed in claim 13, wherein calculation of the transmission powers further comprises:
   respectively delaying the first scrambled signals to obtain a plurality of delayed signals;
   respectively performing XOR operations on the delayed signals and corresponding scrambled signals to obtain a plurality of transition signals; and
   respectively counting the numbers of times signal value transition occurs in the transition signals to obtain the transmission powers.

17. The data access method as claimed in claim 13, wherein the at least one first input data is a plurality of pieces of first input data, and generating of the first input data comprises dividing the first source data to a plurality of segments as the plurality of pieces of first input data.

18. The data access method as claimed in claim 17, wherein the data access method further comprises:
   when scrambling one of the segments, simultaneously encoding an output data corresponding to another one of the segments.

19. The data access method as claimed in claim 13, wherein the method further comprises:
   when a read command is received from the host, directing the memory to read a second error correction code;
   decoding the second error correction code to obtain second output data;
   retrieving a second index and a second scrambled signal from the second output data;
   selecting a target pseudo random sequence corresponding to the second index from the plurality of pseudo random sequences;
   descrambling the second scrambled signal with the target pseudo random sequence to obtain second source data; and
   outputting the second source data to the host.

20. The data access method as claimed in claim 19, wherein descrambling of the second scrambled signal further comprises:
   performing an XOR operation on the target pseudo random sequence and the second scrambled signal to obtain the second source data.

* * * * *